United States Patent [19]

Tutino

[11] Patent Number: 4,587,584
[45] Date of Patent: May 6, 1986

[54] REWIND LEVER FOR A RECIPROCATING TYPE TAPE RECORDER

[75] Inventor: Kunio Tutino, Tottori, Japan

[73] Assignees: Sanyo Electric Co., Ltd.; Tottori Sanyo Electric Co., Ltd., both of Tottori, Japan

[21] Appl. No.: 423,075

[22] Filed: Sep. 24, 1982

[30] Foreign Application Priority Data

Sep. 25, 1981 [JP] Japan .................. 56-152369

[51] Int. Cl.⁴ .................. G11B 17/00; G11B 15/43
[52] U.S. Cl. .................. 360/96.3; 360/96.1; 360/90; 360/93
[58] Field of Search .................. 360/105, 96.2, 96.3, 360/96.1, 96.5, 75, 90

[56] References Cited

U.S. PATENT DOCUMENTS

| 3,758,049 | 9/1973 | Staar | 242/201 |
| 3,887,943 | 6/1975 | Katsurayama | 360/105 |
| 4,101,941 | 7/1978 | Tanaka | 360/75 |
| 4,212,438 | 7/1980 | Schatteman | 242/201 |
| 4,227,223 | 10/1980 | Magata | 360/96.3 |
| 4,238,808 | 12/1980 | Tomita | 360/105 |
| 4,404,610 | 9/1983 | Koizumi et al. | 360/105 |

FOREIGN PATENT DOCUMENTS

| 52-55605 | 5/1977 | Japan | 360/96.3 |
| 52-73706 | 6/1977 | Japan | 360/90 |
| 54-101302 | 8/1979 | Japan | 360/96.3 |
| 54-109808 | 8/1979 | Japan | 360/96.3 |
| 55-1687(A) | 8/1980 | Japan | 360/96.3 |

Primary Examiner—Stuart N. Hecker
Assistant Examiner—Alfonso Garcia
Attorney, Agent, or Firm—Armstrong, Nikaido, Marmelstein & Kubovcik

[57] ABSTRACT

The disclosure is directed to an improved reciprocating type cassette tape recorder which is arranged to effect the function of a selected pushbutton irrespective of a running direction of a magnetic tape by providing pushbuttons exclusive for fast forwarding and rewinding.

3 Claims, 5 Drawing Figures

REWIND LEVER FOR A RECIPROCATING TYPE TAPE RECORDER

BACKGROUND OF THE INVENTION

The present invention generally relates to a magnetic tape recorder and more particularly, to a reciprocating type cassette tape recorder provided with a fast forwarding and rewinding arrangement.

Commonly, in a reciprocating or reversing type cassette tape recorder of the above described kind, there are respectively provided a fast forward pushbutton for fast forwarding of a magnetic tape in a leftward direction, and another fast forward pushbutton for fast forwarding of the magnetic tape in rightward direction, and in order to effect fast forwarding or rewinding of the magnetic tape, it has been necessary to select for actuation, the fast forward pushbutton for the leftward direction or that for the rightward direction, after having ensured the running or travelling direction of the magnetic tape at the time.

More specifically, in the conventional reciprocating type cassette tape recorder as described above, it has been required for an operator to confirm the running direction of the magnetic tape, for example, by a direction indicator or the like, so as to select for actuation, the leftward fast forward pushbutton for effecting the fast forwarding, and the rightward fast forward pushbutton for effecting the rewinding, when the magnetic tape is running, for example, in the leftward direction, while on the contrary, to select for actuation, the rightward direction fast forward pushbutton for effecting the fast forwarding, and the leftward fast forward pushbutton for effecting the rewinding, when the magnetic tape is travelling in the rightward direction. As described above, since the same pushbutton is arranged to function for the fast forwarding and rewinding depending on the running direction of the magnetic tape, the operator is obliged to judge which pushbutton should be actuated at each operation, and thus, the known arrangement is not preferable, especially when the operation must be effected during driving of a motor vehicle or the like as in a so-called car stereophonic appliance.

SUMMARY OF THE INVENTION

Accordingly, an essential object of the present invention is to provide an improved reciprocating type cassette tape recorder which is arranged to effect the function of a selected pushbutton irrespective of a running direction of a magnetic tape, by providing pushbuttons exclusive for fast forwarding and rewinding.

Another important object of the present invention is to provide a reciprocating type cassette tape recorder of the above described type which is simple in construction and highly reliable in functioning, and can be produced at low cost.

In accomplishing these and other objects, according to one preferred embodiment of the present invention, there is provided a reciprocating type cassette tape recorder for use with a magnetic tape cassette accommodating therein a magnetic tape, which comprises a magnetic head means, a magnetic tape driving mechanism for driving the magnetic tape selectively in a first and a second directions, and means for changing over said magnetic tape driving mechanism further including a first gear normally driven for rotation by a driving means, a magnetic tape driving mechanism change-over lever associated with said magnetic tape driving mechanism for the changing-over thereof, a second gear so engaged with said first gear and the magnetic tape driving mechanism change-over lever as to cause said magnetic tape driving change-over lever to pivot from one position to another, and a stopper lever for preventing said second gear from rotation. The cassette tape recorder is characterized in that there is further provided a rewind lever formed with a first and a second taper edges so that upon depression of said rewind lever for actuation, said first taper edge controls said stopper lever so as to change-over the running direction of the magnetic tape from the first direction to the second direction, and upon restoration of said rewind lever for releasing, said second taper edge controls said stopper lever so as to again change-over the running direction of the magnetic tape from the second direction to the first direction.

By the arrangement of the present invention as described above, an improved reciprocating type cassette tape recorder efficient in operation has been advantageously presented through simple construction, with substantial elimination of disadvantages inherent in the conventional cassette tape recorder of this kind.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
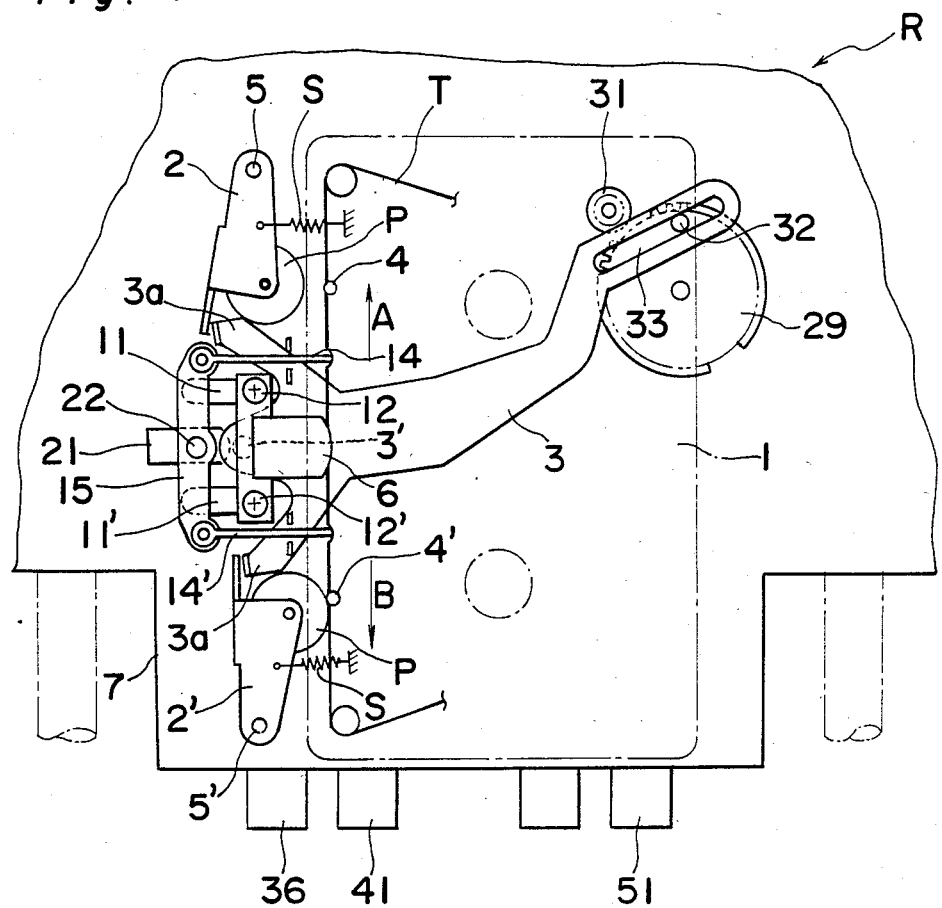
FIG. 1 is a top plan view showing a main portion of a reciprocating type cassette tape recorder according to one preferred embodiment of the present invention.
Figure 2:
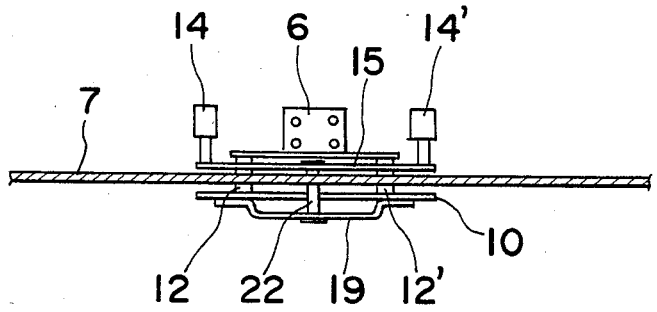
FIG. 2 is a fragmentary side sectional view of the arrangement of FIG. 1 as viewed from the left hand side thereof.

Before the description of the present invention proceeds, it is to be noted that like parts are designated by like reference numerals throughout the accompanying drawings.

Referring now to the drawings, there is shown in FIGS. 1 through 5, a reciprocating or reversing type cassette tape recorder R according to one preferred embodiment of the present invention, into which a magnetic tape cassette 1 is arranged to be longitudinally inserted as shown in FIG. 1.

Figure 3:
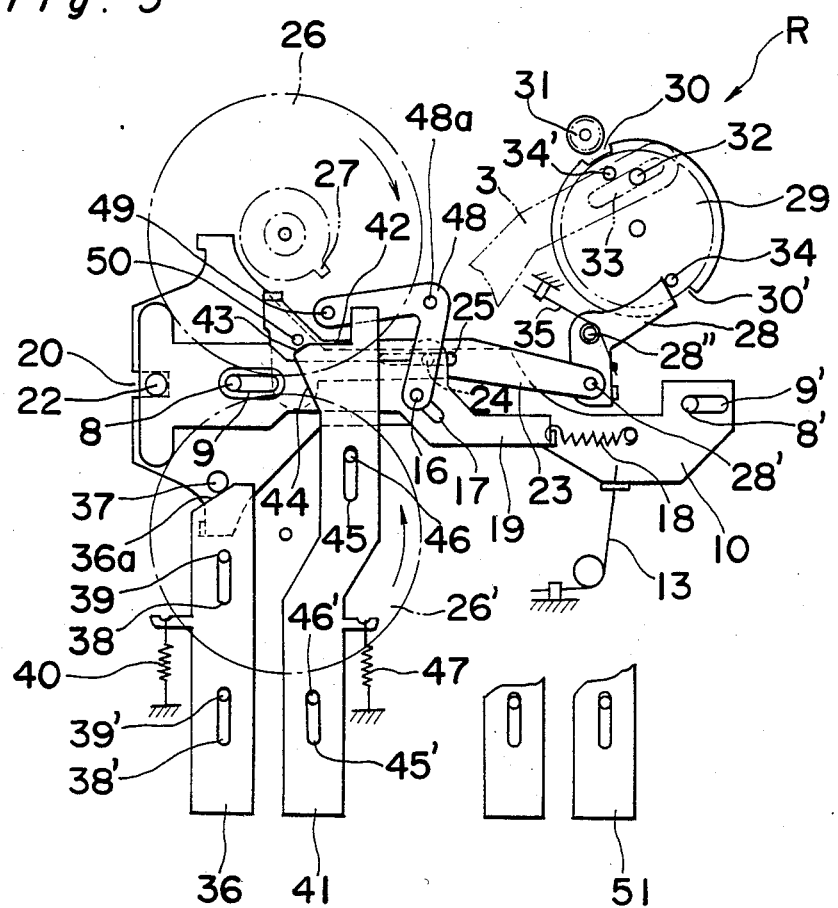
FIG. 3 is a bottom plan view partly broken away, of the arrangement of FIG. 1, with a chassis thereof being removed for clarity of illustration.
Figure 4:
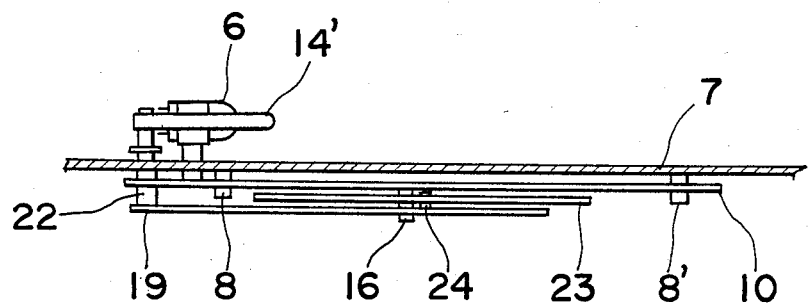
FIG. 4 is a fragmentary side sectional view of the arrangement of FIG. 1 as viewed from the front side thereof (i.e. bottom side of FIG. 1)

The cassette tape recorder R may normally be accommodated in a casing, although not particularly shown, and generally includes a chassis 7, a first and a second pinch rollers P which are rotatably mounted on a first and a second pinch levers 2 and 2' pivotally supported on chassis pins 5 and 5' and normally urged by springs S towards a first and a second capstans 4 and 4', a driving mechanism change-over lever 3 pivotally connected at its one end to a frame of the tape recorder R by a pin 3' and having arms 3a extending outwardly from said one end for contact with the pinch levers 2 and 2' so as to bring the pinch rollers P selectively into contact with the corresponding capstans 4 and 4', and a magnetic head 6 which is secured to fixing shafts 12 and 12' extending upwardly, through openings 11 and 11' formed in the chassis 7, from a head base plate 10 (FIGS. 2 and 3) arranged to be laterally slidable through engagement of its elongated openings 9 and 9' with chassis pins 8 and 8' in a position below the chassis 7, and which is adapted be inserted into the tape cassette 1 so as to be brought into contact with the surface of a magnetic tape T through movement of the head base plate 10 normally urged rightwards in FIGS. 1 and 3 by a spring 13 (FIG. 3) connected at its one end, to said base plate 10 and at the other end thereof, to the chassis 7.

Adjacent to opposite sides of the magnetic head 6, there are provided sensors 14 and 14' which are mounted on a connecting plate 15 so as to be inserted into corresponding small openings of the tape cassette 1 for detection of increase of a tension of the magnetic tape T at terminal ends of said magnetic tape. The connecting plate 15 is connected to an actuating lever 19 through a connecting shaft 22 extending upwardly from said actuating lever 19 via a through-hole 21 provided in the chassis 7 and engaged with a notch 20 formed in the head base plate 10, while the actuating lever 19 is formed with an inclined groove or slit 17 which receives therein a guide pin 16 secured to the head base plate 10, and is arranged to be movable simultaneously with the head base plate 10 as one unit through a spring 18 (FIG. 3) connected between said actuating lever 19 and said head base plate 10. Accordingly, when the tension of the magnetic tape T increases to be larger than the urging force of the spring 18 at the terminal end of the magnetic tape T and the connecting plate 15 is shifted leftwards in FIG. 3 along the notch 20 of the head base plate 10, the actuating lever 19 is rotated counterclockwise about the connecting shaft 22 through the inclined groove 17 of said lever 19. In a position below the chassis 7 and between the head base plate 10 and the actuating lever 19, there is further provided a transmission lever i.e. a starting lever 23 which receives a connecting pin 24 provided on the actuating lever 19 in an elongated groove or slit 25 formed in said lever 23, while one end of the starting lever 23 is located in a position engageable with a projection 27 provided on one fly-wheel 26 during functioning of the actuating lever 19, with the other end of said lever 23 being connected to a stopper lever 28 to be described later.

There are further provided a first gear 31 normally driven for rotation by a motor (not shown), and a second gear 29 having teeth-lacking portions 30 and 30' and engaged with said first gear 31 so as to be rotated by a half rotation, while a projecting pin 32 provided on the second gear 29 in an eccentric position is received in an elongated opening 33 formed in one end of the driving mechanism change-over lever 3, and thus, the second gear 29 is urged for rotation in the clockwise direction by the spring force of the springs S biasing the pinch levers 2 and 2'. The second gear 29 is further provided with stopper pins 34 and 34' respectively positioned adjacent to the teeth-lacking portions 30 and 30' thereof, and the generally L-shaped stopper lever 28 is pivotally supported by a pin 28" and normally urged counterclockwise by a spring 35 connected between said lever 28 and the chassis 7 for engagement with the stopper pin 34 at its one end, with the other end of the lever 28 being pivotally connected by a pin 28' to the other end of the starting lever 23 as referred to earlier.

The cassette tape recorder R further includes a fast forward lever 36 axially formed with elongated openings 38 and 38' slidably engaged with chassis pins 39 and 39' for vertical sliding movement in FIG. 3 and normally urged downwardly by a return spring 40 connected between said lever 36 and the chassis 7, with a tapered edge 36a formed at one end of said lever 36 contacting a projecting pin 37 provided on the head base plate 10, and also, a rewind lever 41 axially formed with elongated openings 45 and 45' slidably engaged with chassis pins 46 and 46' for vertical sliding movement in FIG. 3 so as to be normally urged downwardly by another return spring 47 connected between said lever 41 and the chassis 7, and having a stepped portion 42, and first and second tapered edges 43 and 44 formed at one end of said rewind lever 41.

The stepped portion 42 of the rewind lever 41 is arranged to be engageable with a projection 49 provided at one end of a generally V-shaped rotary lever 48 which is pivotally supported by a pin 48a and fitted, at the other end thereof, onto the guide pin 16 of the head base plate 10, while the first tapered edge 43 of said rewind lever 41 is adapted to be engaged with a projecting pin 50 provided on the starting lever 23. It should be noted here that the fast forward lever 36 and rewind lever 41 are arranged to be locked at depressed actuated positions by a locking mechanism (not particularly shown) and released from the locking upon depression of an eject lever 51 in a known manner. There is further provided another fly wheel 26' which is adapted to be driven for rotation in a direction opposite to that of the fly wheel 26 described earlier by a motor and belt arrangement (not shown). Although not particularly shown, there is also provided a reel spindle driving mechanism which is arranged to selectively drive reel spindles in correspondence to change-over of the running direction of the magnetic tape T.

By the above arrangement, functionings of the cassette tape recorder R according to the present invention will be described hereinbelow.

In the first place, prior to loading of the tape cassette 1 into the tape recorder R, the head base plate 10 has been shifted leftwards in FIGS. 1 and 3 against the urging force of the spring 13 so as to be locked thereat by the locking mechanism (not shown), with the magnetic head 6, sensors 14 and 14' and pinch levers 2 and 2' being spaced from the tape cassette 1. Upon releasing of the head base plate 10 from the locking by the loading of the tape cassette 1, the head base plate 10 is slid rightwards by the urging force of the spring 13 so as to insert the magnetic head 6 into the tape cassette 1, while simultaneously, the sensors 14 and 14' are also directed into the tape cassette 1, since the actuating lever 19 is arranged to be moved together with the head base plate 10 as one unit through engagement between the inclined groove 17 thereof with the guide pin 16 of the head base plate 10. Meanwhile, owing to the disengagement with respect to the pinch levers 2 and 2' through movement of the head base plate 10, either one of the pinch rollers P is brought into pressure contact with the corresponding capstan 4 or 4' to start reproduction of the magnetic tape T. It should be noted here that, during the reproduction, since the first gear 31 corresponds to one of the teeth-lacking portions 30 and 30' of the second gear 29, with the rotation of the gear 29 being prevented through engagement of the stopper lever 28 and the stopper pin 34, there is no possibility that the second gear 29 is driven for rotation.

Subsequently, when the tension of the magnetic tape T has been increased to be larger than the urging force of the spring 18 connected between the actuating lever 19 and head base plate 10 at the terminal end of the magnetic tape T upon termination of the reproduction, the sensors 14 and 14' are shifted leftwards in FIGS. 1 and 3 to actuate the actuating lever 19. In the above case, the actuating lever 19 is subjected to sliding movement towards the left and simultaneously, to counter-clockwise rotation about the connecting shaft 22 through engagement of the guide pin 16 of the head base plate 10 and the inclined groove 17 formed in said lever 19. The rotation of the actuating lever 19 is further transmitted to the starting lever 23 through the connecting pin 24 provided on the actuating lever 19 and engaged with the elongated opening 25 of the starting lever 23 so as to rotate said lever 23 in the clockwise direction about the pivotal connection 28' with respect to the stopper lever 28 for bringing the one end of said starting lever 23 into the position engageable with the projection 27 provided on the fly wheel 26. Upon engagement of the starting lever 23 with the projection 27, the starting lever 23 is shifted in the leftward direction so as to rotate the stopper lever 28 clockwise about the pin 28" for disengagement with respect to the stopper pin 34. Owing to the releasing of the stopper pin 34, the second gear 29 is rotated clockwise to a certain extent through the urging force in the clockwise direction applied thereto through the driving change-over lever 3 based on the spring force biasing the pinch lever 2 so as to be brought into engagement with the first gear 31, and is further rotated in the clockwise direction by the driving force of the first gear 31. When the second gear 29 is thus rotated by a half rotation, the other teeth-lacking portion 30' of said gear 29 comes to confront the first gear 31 for disengagement with respect to the first gear 31, while the second gear 29 is prevented from rotation through engagement of the end of the stopper lever 28 already returned to its original position by the action of the spring 35, with the other stopper pin 34' of said second gear 29. Accordingly, by the rotation of the second gear 29 as described above, the driving mechanism change-over lever 3 engaged, at its elongated opening 33, with the projecting pin 32 provided in the eccentric position on the second gear 29, is rotated clockwise about the pivotal pin 3' so as to change-over the pinch rollers P held in pressure contact, and also, to change-over the reel driving mechanism (not shown) for reversing the running direction of the magnetic tape.

Subsequently, in the manner similar to that described so far, upon reaching the terminal end of the magnetic tape T, the sensors 14 and 14' detect the increase of the tape tension, and through change-over of the driving mechanism change-over lever 3 by the driving of the second gear 29, the running direction of the magnetic tape T may be reversed.

Hereinbelow, the fast forward and rewinding functionings in the case where the magnetic tape T is travelling in a direction indicated by an arrow A (FIG. 1) will be described.

Upon depression of the fast forward lever 36 for actuation to effect the fast forwarding, the taper edge 36a at its one end, depresses the projecting pin 37 of the head base plate 10 to shift said base plate 10 leftwards in FIGS. 1 and 3 for spacing the magnetic head 6 and the pinch levers 2 and 2' from the tape cassette 1, and therefore, the pinch roller P is released from the pressure contact with the corresponding capstan 4, so that the magnetic tape T is wound in the direction of the arrow A at a speed higher than that in the reproduction to establish the fast forwarding state.

Subsequently, when the rewind lever 41 is depressed for effecting the rewinding, the first taper edge 43 of the rewinding lever 41 contacts the projecting pin 50 of the starting lever 23 to rotate said lever 23 clockwise about the pivotal connection 28' of the stopper lever 28, and thus, the starting lever 23 is engaged with the projection 27 of the fly wheel 26 for reversing of the running direction of the magnetic tape T in the manner as described earlier. In this case, the stepped portion 42 of the rewind lever 41 simultaneously contacts the projection 49 of the rotary lever 48 to rotate said lever 48 in the clockwise direction about the pin 48a, and therefore, the head base plate 10 is shifted leftwards through the guide pin 16 for spacing of the magnetic head 6 and the pinch roller P from the tape cassette 1, and thus, the magnetic tape T is wound in the direction of the arrow B at a high speed to establish the state of rewinding.

Figure 5:
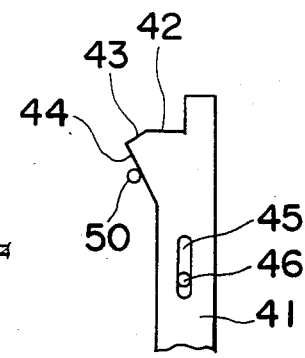
FIG. 5 is a fragmentary top plan view explanatory of the functioning of a rewinding lever employed in the arrangement of FIG. 1.

In the above state, when the eject lever 51 is lightly depressed to stop the rewinding, the rewind lever 41 is returned to the original position by the action of the return spring 47 through releasing of the locking by the locking mechanism (not shown), but during the rewinding, since the projecting pin 50 of the starting lever 23 is located at a position abutting against the second taper edge 44 of the rewind lever 41 as shown in FIG. 5, said second taper edge 44 contacts the projecting pin 50 during returning of the rewind lever 41 to shift the starting lever 23 leftwards, whereby the stopper lever 28 is rotated clockwise about the pivotal pin 28" so as to be released from engagement thereof with the stopper pin 34' of the second gear 29. Accordingly, the running direction of the magnetic tape T is again reversed into the original running direction, with simultaneous shifting of the head base plate 10 towards the tape cassette 1 through returning of the rotary lever 48.

On the other hand, when the fast forward lever 36 is operated in the state where the magnetic tape T is running in a direction indicated by the arrow B, the magnetic tape T is wound at a high speed in the direction of the arrow B to establish the state of fast forwarding, and upon actuation of the rewind lever 41, the running direction of the magnetic tape T is reversed in the similar manner as described earlier, and after once being caused to run in the direction of the arrow A, the magnetic tape T is returned, in its running direction, back to the direction of the arrow B again by the reversing of the tape running direction, and thus, the state of rewinding is established.

It should be noted here that, in the foregoing embodiment, although the starting lever 23 is arranged to be shifted leftwards in FIGS. 1 and 3 through engagement with the fly wheel 26 by pivoting the starting lever 23 through depression of the rewind lever 41, the arrangement may be so modified as to shift the starting lever 23 towards the left side by the depression of the rewind lever 41, if the configurations of the taper edges 43 and 44 of the rewind lever 41 are altered accordingly.

As is clear from the foregoing description, according to the reciprocating type cassette tape recorder of the present invention, it is so arranged that, by reversing the running direction of the magnetic tape upon actuation of the rewind lever, and again reversing the running direction upon completion of the rewinding to be returned to the original running direction, it is possible to effect the function of the selected pushbutton irrespective of the running direction of the magnetic tape, upon actuation of the fast forward and rewind pushbuttons, and thus, since there is no necessity to select the pushbuttons, with particular attention directed to the running direction of the magnetic tape, the operability of the tape recorder has been remarkably improved for application, for example, to stereophonic appliances for motor vehicles and the like.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. In a reciprocating type cassette tape recorder for use with a magnetic tape cassette accommodating therein a magnetic tape, which comprises a magnetic head means, a pair of pinch rollers selectively brought into pressure contact with a pair of capstans, a magnetic tape driving mechanism for driving the magnetic tape selectively in first and second directions, and means for changing over said magnetic tape driving mechanism further including a first gear normally driven for rotation by a driving means, a magnetic tape driving mechanism change-over lever associated with said magnetic tape driving mechanism for the changing-over of the tape direction, a second gear so engaged with said first gear and the magnetic tape driving mechanism change-over lever as to cause said magnetic tape driving change-over lever to pivot from one position to another, and a stopper lever for preventing said second gear from rotation, the improvement comprising a rewind lever formed with first and second taper edges, and an actuating stepped portion, so that upon depression of said rewind lever for actuation, said first taper edge controls said stopper lever so as to change-over the running direction of the magnetic tape from the first direction to the second direction, with said actuating stepped portion simultaneously causing the pinch roller to disengage from the capstan and upon restoration of said rewind lever for releasing, said second taper edge controls said stopper lever so as to again change-over the running direction of the magnetic tape from the second direction to the first direction, with said actuating stepped portion simultaneously causing the pinch roller to engage the capstan.

2. A reciprocating type cassette tape recorder as claimed in claim 1, further including a sensor means for detecting increase in a tension of the magnetic tape at terminal end portions of said magnetic tape, and a transmission lever means for transmitting displacement of said sensor means to said stopper lever.

3. A reciprocating type cassette tape recorder as claimed in claim 2, wherein said transmission lever means is arranged to engage a projection of a fly-wheel through the displacement of said sensor means so as to drive said stopper lever by rotational force of said fly-wheel.

* * * * *